Jan. 6, 1959 TETSURO OKIMOTO 2,867,054
WARNING DEVICE
Filed July 31, 1957 2 Sheets-Sheet 2
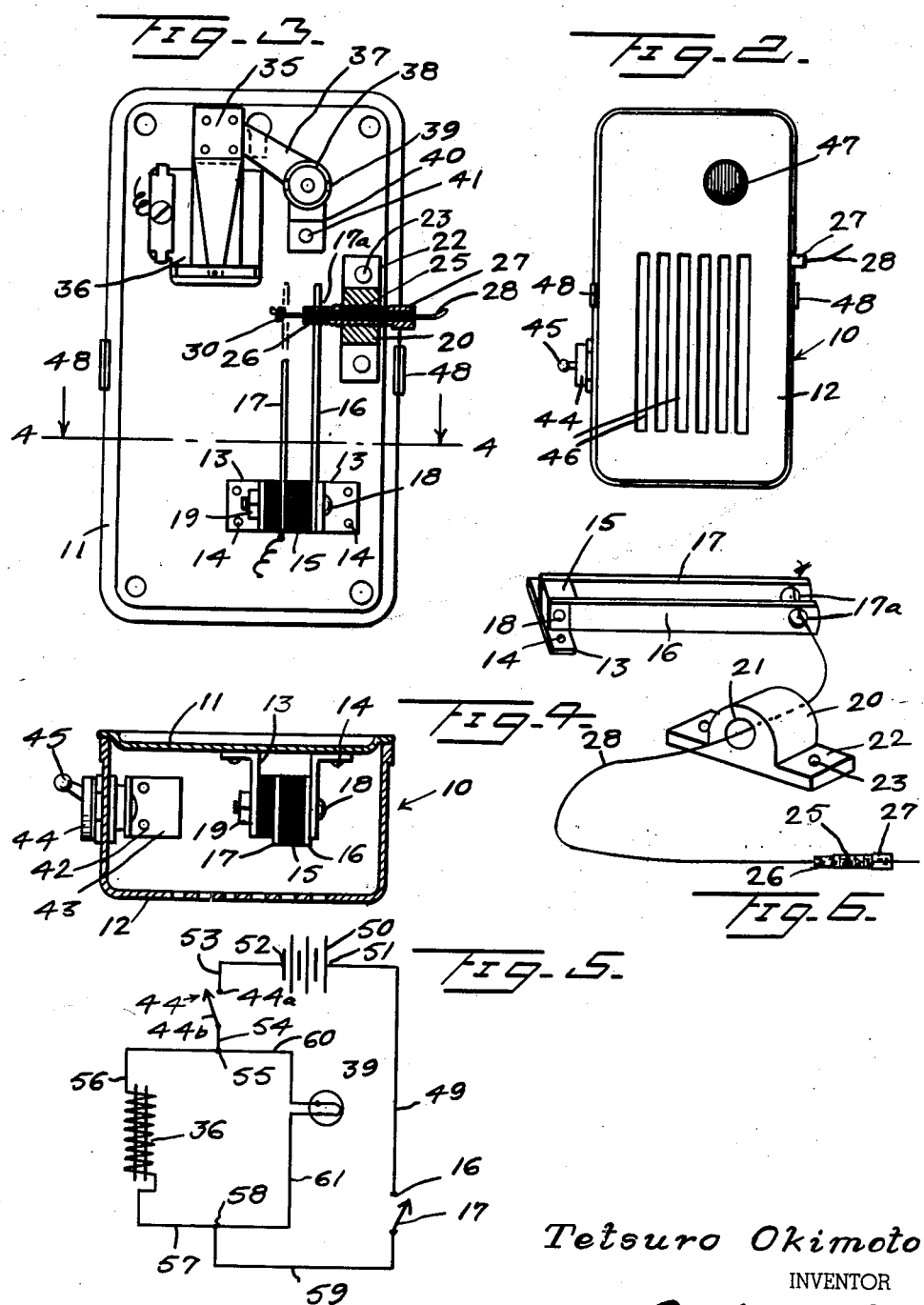
Tetsuro Okimoto
INVENTOR

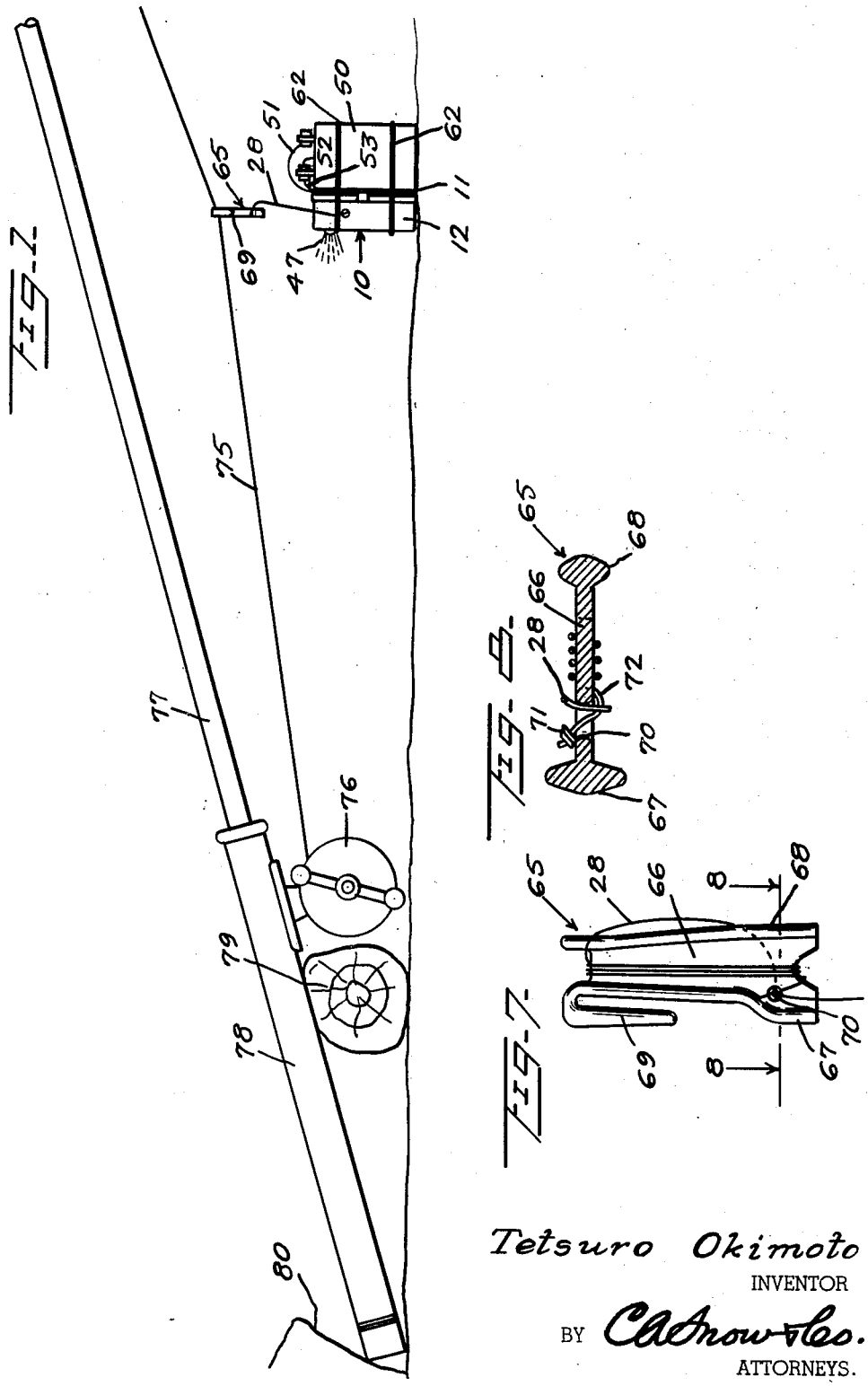

United States Patent Office 2,867,054
Patented Jan. 6, 1959

2,867,054

WARNING DEVICE

Tetsuro Okimoto, Sacramento, Calif.

Application July 31, 1957, Serial No. 675,460

1 Claim. (Cl. 43—17)

This invention relates to a warning device, and has particular applicability to a device for attachment to a fishing line for the purpose of indicating a bite on the line, permitting the fisherman to leave the line unattended.

A primary object of the invention is the provision of an improved warning or signalling device provided with both audible and visual indicating means, whereby to attract the attention of a fisherman or other user upon the closure of a switch mechanism.

An additional object of the invention is the provision of a device which may be readily employed with any suitable source of electric power, such as a conventional dry cell battery, or a flashlight, with the bulb removed.

A further object of the invention is the provision of a device of this character which is relatively compact, and easily portable.

Still another object of the invention is the provision of a warning device which may be suitably employed, to indicate visually the ringing of a doorbell, as for example, to a deaf person, or which may be connected to a door, to indicate both audibly and visually the opening of the door, or a drawer, for similar purposes, or in any location where a warning or signal is desired to indicate the movement of any object.

A further object of the invention resides in the provision of an improved connecting hook for attaching the device to a fishing line or the like.

A further object of the invention is the provision of such a device which is sturdy and durable in construction, reliable and efficient in operation, and relatively simple and inexpensive to manufacture, assemble, and utilize, and which is compact and readily portable.

Further objects reside in the combinations of elements, arrangements of parts, and features of construction, all as will be more fully pointed out hereinafter, and shown in the accompanying drawings, wherein there is disclosed a preferred embodiment of this inventive concept.

In the drawings:

Figure 1 is a side elevational view, partially broken away, showing the device of the instant invention as attached to a fishing line, carried by a conventional fishing pole.

Figure 2 is a front plan view of the device.

Figure 3 is a plan view of the device taken from the rear, with the cover or casing removed, showing certain constructional details in section.

Figure 4 is a sectional view taken substantially along the line 4—4 of Figure 3 as viewed in the direction indicated by the arrows, but showing the cover in position, the wiring being omitted for the sake of clarity of illustration.

Figure 5 is a schematic wiring diagram of the device.

Figure 6 is an exploded perspective view of certain elements comprising a feature of the instant invention.

Figure 7 is an enlarged and elevational view of the hook for securing the device to a fishing line or the like, and Figure 8 is a sectional view taken substantially along the line 8—8 of Figure 7 as viewed in the direction of the arrows.

Similar reference characters refer to similar parts throughout the several views of the drawing.

Having reference now to the drawings in detail, the warning device of the instant invention is generally indicated at 10, and comprises a casing, including a base 11, and a cover 12. Base 11 has secured thereto a pair of L-shaped brackets 13, the securing means taking the form of rivets or bolts 14, and an insulating block 15, carrying a pair of spaced apart resilient contact arms 16 and 17 are secured in insulated relation in the insulating block 15. A bolt 18 and nut 19 extend through block 15 and arms 16 and 17, as well as suitable apertures in the upstanding legs of L-shaped brackets 13, for securing the parts in related assembly.

A bracket 20 having a threaded bore 21 extending therethrough is provided with flanges 22, which are secured to the base 11 in any desired manner, as by means of rivets 23.

An externally threaded sleeve or tube 25 is threaded into bore 21, and is provided interiorly with an unthreaded portion 26, which extends through an opening 17a in contact arm 16. The member 25 is preferably of metallic construction, as is the tip 26, the bracket 20 being of insulating material. The other end of sleeve 25 comprises a bushing 27, which extends through a suitable opening in the side wall of cover 12. A line 28 extends through the hollow interior of sleeve 25, and passes through an opening 17a in contact arm 17, being knotted as at 30, to retain the end of the line in the opening. Thus, any pull exerted on line 28 will obviously move the contact 17 toward the contact 16, to close a circuit, in a manner and for a purpose to be more fully described hereinafter.

The base 11 also carries a mounting bracket 35, which holds a buzzer 36, or other audible signalling device, of any desired conventional type, the bracket 35 having an extending arm 37, which in turn carries a light socket 38, in which is mounted a bulb 39, the socket also being supported by a mounting flange 40 suitably riveted as by rivet 41, or otherwise secured to the base 11.

The cover 12 has suitably secured thereto in any desired manner as by rivets 42 a mounting bracket 43, which carries a conventional two position snap switch 44 with an externally located manual operating arm 45.

The contacts 16 and 17, with switch 44, the buzzer 36, and the light bulb 39 are all electrically connected, in a manner to be more fully described hereinafter.

Cover 12 is provided with a plurality of slots or openings 46, through which the sound of the audible signal 36 may be heard, and also has an opening or aperture 47 therein, through which the light bulb 39 is visible.

The base 11 carries a pair of oppositely disposed spring clips 48, for securing the cover 12 in related assembly therewith.

Figure 5 discloses the electrical connections for the warning device, and it will be seen that a wire 49 extends to one terminal 51 of a battery 50, from the other terminal 52 of which a wire 53 extends to one terminal 44a of manual switch 44. From the other terminal 44b of switch 44, a wire 54 leads to a junction 55, from which a wire 56 extends to a terminal of buzzer or audible signal 36. A wire 57 extends from the other terminal of buzzer 36 to a junction 58, from which a wire 59 extends to contact arm 17. Junction 55 also has a wire 60 extending therefrom to one terminal of lamp 39, from the other terminal of which a wire 61 extends to junction 58. It will thus be seen that when switch 44 is closed, the circuit will remain open, until a pull on line 28 causes arm 17 to contact arm 16, whereupon the circuit is established, as above described through audible signal 36, and simultaneously through light 39, to actuate both the audible and visual signalling means. Obviously, the spacing of contacts 16 and 17 may be varied by rotating the threaded sleeve 25, which will force contact arm 16 inwardly, which will vary the relative distance between contact tip 26 and contact arm 17, the tip 26 being in electrical association with the contact arm 16.

Referring particularly to Figure 1, the battery 50 is disclosed as being attached to the warning device 10, as by means of ties or bands 62. However, if desired, the casing 10 may be enlarged sufficiently to contain a flashlight battery or the like as an integral part thereof. It will be seen that the line 28 extends to a hook member 65, which, as best shown in Figures 7 and 8, is comprised of a shank portion 66, having downwardly diverging flanges 67 and 68 on opposite sides thereof to provide a guide. The flange 67 at its upper extremity is provided with reverted end portion 69, which forms a hook. The lower portion of shank 66 has an aperture 70 therein, through which the end of line 28 is adapted to be passed and knotted as indicated at 71. The line is then wound a desired number of times about shank 66, overlying a portion of the line as indicated at 72, so that the line may be tightened or loosened by providing a desired number of turns about the shank 66, from the side of the line opposite that portion which extends to the device 10, the loop thus formed and the knot 71 thus serving to hold the wound line on the shank 66.

One form of application of the device is disclosed in Figure 1, wherein portion 69 of hook 65 is looped over a fishing line 75, at a portion between a conventional reel 76, and the tip (not shown) of a conventional fishing rod 77.

One method of supporting the rod in an inclined position is disclosed in Figure 1 wherein the butt 78 of the rod is mounted on a log 79, or similar supporting surface, and has its end wedged beneath a rock 80 or the like.

Obviously, any suitable method may be employed for mounting or supporting the fishing pole as desired. Equally obviously, the hook 65 may be applied over the edge of a drawer, or around a door, or in any desired location, to actuate the audible and visual signals upon movement of the object to which the hook is attached.

As many embodiments may be made of this inventive concept, and as many modifications may be made in the embodiment hereinbefore shown and described, it is to be understood that all matter herein is to be interpreted merely as illustrative and not in a limiting sense.

What I claim as my invention is:

In a warning signal in combination, a base, a hollow cover having an opening therein for said base, an insulating block secured to said base, a pair of flexible contacts, each having an opening therethrough, mounted on and extending from said insulating block, an audible signal on said base, a visual signal on said base, an electrical circuit connecting said flexible contacts and said audible and visual signals, a source of power for said circuit, a manual switch in said circuit, an externally threaded metallic sleeve having an unthreaded reduced end portion extending through said opening in said hollow cover, an insulating bushing having a threaded bore extending therethrough carried by said base, said sleeve being threadedly engaged in said bushing, the unthreaded reduced end of said sleeve being extended through the opening in the contact adjacent said bushing, the other end of said sleeve being unthreaded and enlarged and seating in said opening in said hollow cover, a flexible cord extending through said threaded sleeve to a point exteriorly of signal and connected through the opening in the more remote of said flexible contacts to the remote contact, whereby a pull on said flexible cord will move said remote contact into engagement with said adjacent contact and said end of said metallic sleeve.

References Cited in the file of this patent

UNITED STATES PATENTS

| | | |
|---|---|---|
| 1,737,921 | Derr | Dec. 3, 1929 |
| 2,446,427 | Linder | Aug. 3, 1948 |
| 2,556,628 | Nisle | June 12, 1951 |
| 2,560,905 | Teel | July 17, 1951 |